United States Patent Office 2,934,413
Patented Apr. 26, 1960

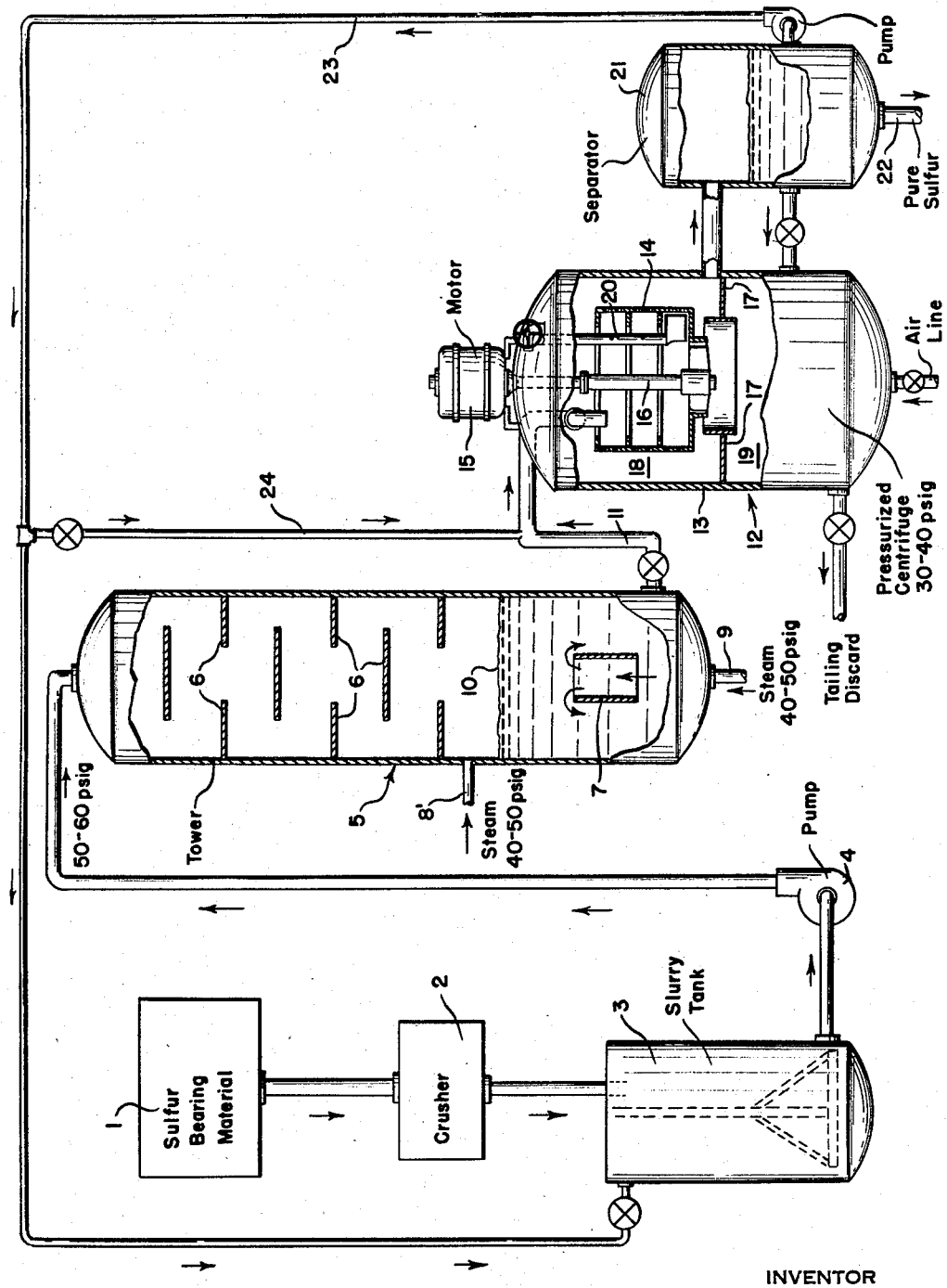

2,934,413
RECOVERY OF ELEMENTAL SULPHUR FROM SULPHUR BEARING MATERIALS

Patrick J. McGauley, Port Washington, N.Y.

Application May 11, 1956, Serial No. 584,290

5 Claims. (Cl. 23—308)

This invention relates to a method of recovering elemental sulphur from native sulphur bearing materials. More particularly, the invention relates to a method of recovering elemental sulphur from native sulphur bearing material by treating the sulphur bearing material in the presence of super-heated water to melt the contained sulphur and to form a three-phase pulp containing super-heated water, liquid sulphur, and solid gangue, and centrifuging this mixture at a temperature sufficiently elevated to maintain the sulphur in the liquid state. The invention also includes a novel over-all process by which elemental sulphur is recovered from native sulphur bearing material with super-heated water, and that super-heated water is used and recycled in such a manner as to effect a very efficient over-all process.

The method of this invention can be used generally with various types of native sulphur bearing materials, including both high- and low-grade ores and concentrates. The method of this invention is particularly advantageous for separating elemental sulphur from surface deposits of elemental sulphur bearing material. The over-all method of this invention also results in the recovery of elemental sulphur in an advantageous and simple manner involving both low processing costs and low equipment costs.

According to this invention either a high- or low-grade sulphur bearing material is mixed with water to form a slurry. The slurry is heated in the presence of super-heated water to a temperature sufficiently high to melt the elemental sulphur and form a three-phase pulp containing liquid sulphur, super-heated water, and solid gangue. The three-phase pulp is then transferred into the revolving basket of a centrifugal separator where the solids are retained on the screen or filter media, and the two liquids are forced through these solids by centrifugal force and then flow into a separating vessel also under pressure. The super-heated water and elemental sulphur in the separating vessel are then separated from each other in any suitable manner.

The drawing illustrates one manner of carrying out the method of this invention, and also illustrates particular types of equipment which can advantageously be used. Variations of the equipment and of the particular method disclosed in the drawing can be made by those skilled in the art without departing from the scope of this invention. The invention is described in more detail below with reference to the drawing.

The drawing illustrates a storage bin 1 which can be used, if desired, to store the sulphur bearing material. 2 illustrates a crusher for the sulphur bearing material, and 3 is a slurry tank in which a water slurry is formed of the sulphur bearing material. The sulphur bearing material slurry is then transferred by means of pump 4 to the top of a sulphur melting tower 5 and deposited in the sulphur melting tower under a pressure of between about 50–60 p.s.i.g. The pump 4 can be of any suitable type capable of transferring the slurry to the sulphur melting tower under sufficient pressure. A conventional slurry transfer pump can be used, for example.

The ratio of solids in the feed slurry to the melting vessel is limited only by the properties of the solid and the efficiency of the pressurizing pump. It is obviously advantageous to form the sulphur bearing material into a slurry having a solids content as high as possible to increase the production rate of the same equipment and decrease the consumption of heat in relation to the production of sulphur.

The sulphur bearing material which is slurried with water should also have a particle size of less than about ¼ to ⅛ of an inch. The particle size limitation on the sulphur bearing material being slurried is not a limitation on the method of this invention but rather an equipment limitation. The particle size of the sulphur bearing material is limited by the pump used to transfer the slurry to the sulphur melting tower. Pumps presently available are not capable of pumping slurries under pressure having a particle size greater than about ¼ to ⅛ of an inch.

The sulphur melting tower contains a series of baffles 6. Live steam is introduced under pressure of about 40–50 p.s.i.g. into the sulphur melting tower at two sources 8' and 9. The slurry is introduced into the top of the sulphur melting tower and descends by gravity flow over the baffles and through the steam atmosphere to the bottom of the tower. As the slurry descends through the steam atmosphere of the tower, it condenses the live steam traveling upwardly, and the sulphur contained in the sulphur bearing particles will be melted and extracted into globules of liquid sulphur forming a three-phase pulp containing super-heated water, liquid sulphur globules, and the solid gangue. The three-phase pulp collects in the bottom of the sulphur melting tower to a suitable level such as that indicated by the numeral 10. The live steam inlet 8' is above the pulp level 10. Most of the heating of the sulphur bearing material is accomplished by the steam from inlet 8'. A pipe 7 is affixed directly above the live steam source 9. The steam from source 9 travels through the pipe 7 and effects an agitation of the three-phase pulp to prevent the settling of the solids in the liquid reservoir at the bottom of the sulphur melting tower.

The three-phase pulp is then transferred from the reservoir in the bottom of the sulphur melting tower to a pressurized centrifuge 12 by means of pipe 11.

In the drawing the centrifuge is shown as having a pressure of between 30–40 p.s.i.g. This is a lower pressure than the pressure maintained in the sulphur melting tower, and the transfer of the three-phase pulp to the centrifuge is accomplished by pressure differential. The pressurized centrifuge has a casing 13 and a revolving basket 14. The centrifuge basket is driven by a motor 15 through the shaft 16. The pressurized centrifuge is also equipped with a plow 20. The flanges 17 divide the casing of the pressurized centrifuge into upper and lower portions 18 and 19, respectively.

The three-phase pulp is transferred into the revolving basket of the centrifuge and is centrifuged therein together with a sufficient amount of super-heated water to maintain the gangue or solids in a water-wetted condition in the basket. The gangue or solids of the pulp are maintained in the water-wetted condition throughout the centrifuging operation. The pulp is fed into the centrifuge basket together with additional super-heated water from the pipe 24 to replace the water flushed from the centrifuge during the centrifuging operation so as to maintain the solids in a water-wetted condition. The three-phase pulp is fed, together with the water, to the centrifuge until the basket is substantially full of solid gangue. As the centrifuging is continued, the sulphur is flushed or sluiced from the retained solids by the added water. This washing action effects a separation of the liquid sulphur from the solid gangue and flushes the two liquid phases into a trough in the upper portion 18 of the centrifuge casing 13. As the liquid sulphur and super-heated water are thrown out of the centrifuge basket they are transferred to a suitable separator 21.

The separator shown in the drawing is a settling tank and is under a pressure of about 30–40 p.s.i.g. The sulphur quickly settles to the bottom of the settling tank. It is then withdrawn as a finished product through the outlet 22. Other suitable separators, such as a cyclone separator, can also be used in place of the settling tank.

As the centrifuging of the pulp continues while being maintained in a water-wetted condition, liquid sulphur and water are thrown therefrom. The water thrown from the centrifuge basket is continuously replaced in a sufficient amount to maintain the solids in a water-wetted condition. As the centrifuging is continued and the sulphur withdrawn therefrom, the pulp is gradually reduced to a two-phase, water-solids pulp. When the basket is substantially full of solid gangue, the feeding of the three-phase pulp is discontinued but the feeding of the hot-super-heated water is increased so that the gangue solids in the basket are maintained in a water-wetted condition until substantially all of the liquid sulphur globules are washed from the retained gangue. The flush water is then discontinued and the residue is allowed to centrifuge dry of water. The dry solids are then plowed from the internal surface of the basket by means of the plow 20 or water jets and passed through the outlet at the bottom of the basket into the pressurized repulp chamber in the bottom portion 19 of the centrifuge casing as shown in the drawing. The solid gangue residue in the bottom portion of the centrifuge chamber can then be repulped with water, preferably by cold water but also by recycled water from the settling tank, and conducted to the tailings or discard pond. In repulping the solid gangue in the bottom of the centrifuge chamber, it is also advantageous to agitate the pulp to aid in repulping it. In the drawing this agitation is accomplished by forcing air into the bottom of the chamber through from an air line as shown in the drawing. After the residue has been removed from the basket, additional pulp can be fed into the centrifuge from the surge basin at the bottom of the sulphur melting tower and the process repeated.

During the centrifuging of the three-phase pulp, it is important to maintain the solids in the pulp in a water-wetted condition. I have found that it is very advantageous to maintain the solid gangue in flooded condition during the centrifuging. In flood feeding the pulp from the sulphur melting tower, it is advantageous to maintain the water level above the level of the solid gangue in the centrifuge basket. Flood feeding the pulp not only maintains the solids or gangue in a water-wetted condition, but further aids in flushing the liquid sulphur through the retained solids and also prevents closing of the interstices in the solids on the centrifuge basket. The water also acts like a sluicing fluid in driving the liquid sulphur through the interstices of the gangue in the centrifuge basket.

As illustrated in the drawing, this invention also includes a novel and advantageous recycle system whereby super-heated water from the settling tank is recycled through the pipe 23 to the centrifuge basket to keep the gangue retained in the basket in a water-wetted or flooded condition while the liquid sulphur is simultaneously being flushed from the retained solids. The super-heated water is separated from the sulphur in the settling tank 21 and is recycled by means of a pump through pipe 23 to the pipe 11 through pipe 24. The super-heated water from the settling tank is also recycle to the slurry tank 3 to slurry additional sulphur bearing material.

In the drawing, the sulphur melting tower is shown having a pressure of between 50–60 p.s.i.g. The pressure of the centrifuge and the settling tank is shown as between 30–40 p.s.i.g. In this pressure differential system, the three-phase pulp is transferred from the sulphur melting tower to the centrifuge by means of the pressure differential, while the transfer of the liquids from the centrifuge basket into the settling tank is by gravity flow since both of these vessels are under the same pressure. Similarly, the water to repulp the solid gangue in the bottom of the pressurized centrifuge can be transferred thereto by gravity flow or a pump can be used if desired. The process of this invention need not however utilize the particular transfer system as shown in the drawing and described in detail. For example, all vessels may be under the same pressure, and all transferring of the pulp and liquid sulphur and water can be by gravity flow. The particular steps of the process, the particular pressures, and the particular equipment shown in the drawing can be varied while still retaining the advantageous process of this invention.

I claim:

1. The method of recovering elemental sulphur from sulphur bearing material which comprises forming a water slurry of the sulphur bearing material, heating the water slurry to a temperature above the melting point of sulphur in the presence of super-heated water to form a three-phase pulp containing super-heated water, liquid sulphur and solid gangue, centrifuging the three-phase pulp at a temperature sufficient to maintain the sulphur in the liquid state while continuously maintaining the solid gangue in a water-wetted condition to separate super-heated water and liquid sulphur from the solid gangue, separating the super-heated water from the sulphur, and recycling a portion of the separated super-heated water to the centrifuge to aid in maintaining the solid gangue in a water-wetted condition.

2. The method of claim 1 in which a portion of the super-heated water separated from the sulphur is also recycled for forming a slurry of additional sulphur bearing material.

3. The method of recovering elemental sulphur from sulphur bearing material in cycles which comprises forming a water slurry of the sulphur bearing material, heating the water slurry to a temperature above the melting point of sulphur in the presence of super-heated water to form a three-phase pulp containing super-heated water, liquid sulphur and solid gangue, feeding the three-phase pulp to the basket of the centrifuge together with sufficient water to effect a flood feeding of the pulp and to continuously maintain the solid gangue in a flooded condition, centrifuging the flood fed pulp while maintaining the pulp at a temperature sufficient to maintain the sulphur in a liquid state to sluice the sulphur from the solid gangue, continuing the flood feeding of the pulp until the centrifuge basket is substantially full of solid gangue, discontinuing the feeding of the three-phase pulp to the centrifuge basket, continuing the feeding of the super-heated water in an amount sufficient to maintain the solid gangue in the basket in a flooded state and continuing the centrifuging until substantially all of the sulphur has been removed to reduce the pulp to water and solid gangue, separating the sulphur from the super-heated water to recover the pure sulphur, discontinuing the feeding of the super-heated water to the centrifuge basket, removing the solid gangue from the centrifuge basket and again flood feeding the three-phase pulp to the centrifuge basket to perform another cycle.

4. The method of claim 3 in which the super-heated water separated from the sulphur is recycled to the centrifuge basket to effect the flood feeding of the three-phase pulp and to maintain the solid gangue in the centrifuge basket during the centrifuging in a flooded condition.

5. The method of claim 4 in which the super-heated water separated from the sulphur is also recycled for forming a slurry of additional sulphur bearing material.

References Cited in the file of this patent

UNITED STATES PATENTS

| | | |
|---|---|---|
| 1,318,015 | Sedgwick | Oct. 7, 1919 |
| 2,090,667 | Crowther | Aug. 24, 1937 |
| 2,731,332 | Ackert et al. | Jan. 17, 1956 |